(12) United States Patent
Prince

(10) Patent No.: US 9,706,830 B1
(45) Date of Patent: Jul. 18, 2017

(54) SUPPORT AND CARRYING APPARATUS FOR A CELLULAR PHONE

(71) Applicant: Monique Prince, Mobile, AL (US)

(72) Inventor: Monique Prince, Mobile, AL (US)

( * ) Notice: Subject to any disclaimer, the term of this patent is extended or adjusted under 35 U.S.C. 154(b) by 0 days.

(21) Appl. No.: 15/008,770

(22) Filed: Jan. 28, 2016

(51) Int. Cl.
*A45F 5/00* (2006.01)
*A45C 11/00* (2006.01)

(52) U.S. Cl.
CPC ............... *A45F 5/00* (2013.01); *A45C 11/00* (2013.01); *A45C 2011/002* (2013.01)

(58) Field of Classification Search
CPC .... A45F 5/00; A45F 5/02; A45F 5/021; A45F 2003/006; A45F 2003/002; A45F 2005/008; A45F 2200/0516; A45C 11/00; A45C 2011/002
USPC ........ 224/600, 675, 222, 578, 672, 674, 676
See application file for complete search history.

(56) References Cited

U.S. PATENT DOCUMENTS

| | | | | |
|---|---|---|---|---|
| 6,662,986 B2* | 12/2003 | Lehtonen | ................... | A45F 5/02 224/222 |
| 7,174,196 B2* | 2/2007 | Matsuda | ................... | A45F 5/00 224/600 |
| 7,416,099 B2* | 8/2008 | deLeon | ................... | H04M 1/05 224/188 |
| D629,192 S | 12/2010 | Pueblo | | |
| 8,794,495 B1 | 8/2014 | Wathen | | |
| 2002/0005419 A1* | 1/2002 | Moreno | ................... | A45F 3/10 224/201 |
| 2002/0043545 A1* | 4/2002 | Tang | ................... | A45F 5/00 224/600 |
| 2004/0048639 A1* | 3/2004 | Obolo | ................... | H04M 1/05 455/575.1 |
| 2005/0221762 A1* | 10/2005 | Greene | ................... | A45F 5/021 455/66.1 |
| 2008/0041897 A1* | 2/2008 | Malhotra | ................... | A45C 11/00 224/199 |
| 2015/0201266 A1* | 7/2015 | Abreu | ................... | H04R 1/1033 381/374 |

* cited by examiner

*Primary Examiner* — Peter Helvey
(74) *Attorney, Agent, or Firm* — Stevenson IP, LLC

(57) ABSTRACT

A support and carrying apparatus for a cellular phone including an adjustable strap and a snap buckle fastener having a male member attached to a right end of the strap. A top end of each of a right second strap and a left second strap of a pair of second straps is attached to a female member of the snap buckle fastener and a left end of the strap, respectively. Each of a right mounting base and a left mounting base is attached to a bottom end of each of the right second strap and the left second strap, respectively. Each of a right arm support and a left arm support of a pair of telescopic arm supports is pivotably attached to each of the right mounting base and the left mounting base, respectively. A middle arm support is attached to the right arm support and the left arm support.

3 Claims, 5 Drawing Sheets

SUPPORT AND CARRYING APPARATUS FOR A CELLULAR PHONE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of cellular phone holders are known in the prior art. However, what has been needed is a support and carrying apparatus for a cellular phone including an adjustable padded strap and a snap buckle fastener having a male member attached to a right end of the strap. The strap is configured to fit over a neck of a wearer. A top end of each of a right second strap and a left second strap of a pair of second straps is attached to a female member of the snap buckle fastener and a left end of the strap, respectively. What has been further needed is for each of a right mounting base and a left mounting base to be attached to a bottom end of each of the right second strap and the left second strap, respectively. A length adjustment mechanism is configured to rotate a lead screw to increase and, alternately, decrease the distance between the right mounting base and the left mounting base. Lastly, what has been needed is for each of a right arm support and a left arm support of a pair of telescopic arm supports to be pivotably attached to each of the right mounting base and the left mounting base, respectively. A middle arm support is attached to the right arm support and the left arm support. A cellular phone is thus removably mountable between an interior surface of each of the right mounting base and the left mounting base. The middle arm support is removably disposed underneath a bottom surface of the cellular phone. The support and carrying apparatus for a cellular phone thus eliminates the need for the wearer to hold a cellular phone in his hand while streaming videos and movies. The pivotable pair of arm supports allows the wearer to adjust the angle of the cellular phone in order to better view its display screen.

FIELD OF THE INVENTION

The present invention relates to cellular phone holders and carrying apparatuses, and more particularly, to a support and carrying apparatus for a cellular phone.

SUMMARY OF THE INVENTION

The general purpose of the present support and carrying apparatus for a cellular phone, described subsequently in greater detail, is to provide a support and carrying apparatus for a cellular phone which has many novel features that result in a support and carrying apparatus for a cellular phone which is not anticipated, rendered obvious, suggested, or even implied by prior art, either alone or in combination thereof.

To accomplish this, the present support and carrying apparatus for a cellular phone includes an adjustable inverted U-shaped padded strap having a left end and a right end. A length of the strap is configured to fit over a neck of a wearer. A male member of a snap buckle fastener is attached to the right end of the strap, with the male member being removably engageable with a female member. A pair of second straps includes a right second strap and a left second strap. Each of the right second strap and the left second strap has a top end and a bottom end. The top end of each of the right second strap and the left second strap is medially attached to the female member of the snap buckle fastener and the left end of the strap, respectively. A pair of mounting bases includes a right mounting base and a left mounting base. Each of the pair of mounting bases is substantially obround. Each of the right mounting base and the left mounting base has an interior surface and an exterior surface. The bottom end of each of the right second strap and the left second strap is attached to the exterior surface of each of the right mounting base and the left mounting base, respectively.

The support and carrying apparatus for a cellular phone further includes a lead screw having a first end and a second end. The first end is mounted to the interior surface of the right mounting base, and the second end is adjustably and threadably engageable within a cap attached to the interior surface of the left mounting base. The lead screw is coupled to a bevel gear system and a length adjustment mechanism. The length adjustment mechanism is configured to rotate the lead screw to increase and, alternately, decrease the distance between the right mounting base and the left mounting base along a length of the lead screw in response to a rotation of a bevel gear of the bevel gear system. Each of a right arm support and a left arm support of a pair of telescopic arm supports has a top edge and a bottom edge. The top edge of each of the right arm support and the left arm support is pivotably attached to the exterior surface of each of the right mounting base and the left mounting base, respectively. A locking mechanism is disposed on one of the pair of arm supports in order to selectively position the pivotable pair of arm supports in a static position. This pivotable attachment of the pair of arm supports allows the wearer to adjust the position of the cellular phone as desired. Furthermore, the telescopic structure of the pair of arm supports ensures that the apparatus is able to adjust to different sized cellular phones. The bottom edge of each of the right arm support and the left arm support is attached to a right surface of a middle arm support and a left surface of the middle arm support, respectively. The right arm support is disposed substantially parallel to the left arm support, and the middle arm support is disposed substantially parallel to the lead screw.

A cellular phone is removably mountable between the interior surface of each of the right mounting base and the left mounting base in front of the lead screw. The length adjustment mechanism ensures that any size cellular phone can be securely and selectively held between each of the pair of mounting bases. Additionally, the middle arm support is configured to be removably disposed underneath a bottom surface of the cellular phone. A circumference of the middle arm support is optionally greater than a circumference of each of the pair of arm supports so that the middle arm support can better cradle the bottom surface of the cellular phone.

Thus has been broadly outlined the more important features of the present support and carrying apparatus for a cellular phone so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
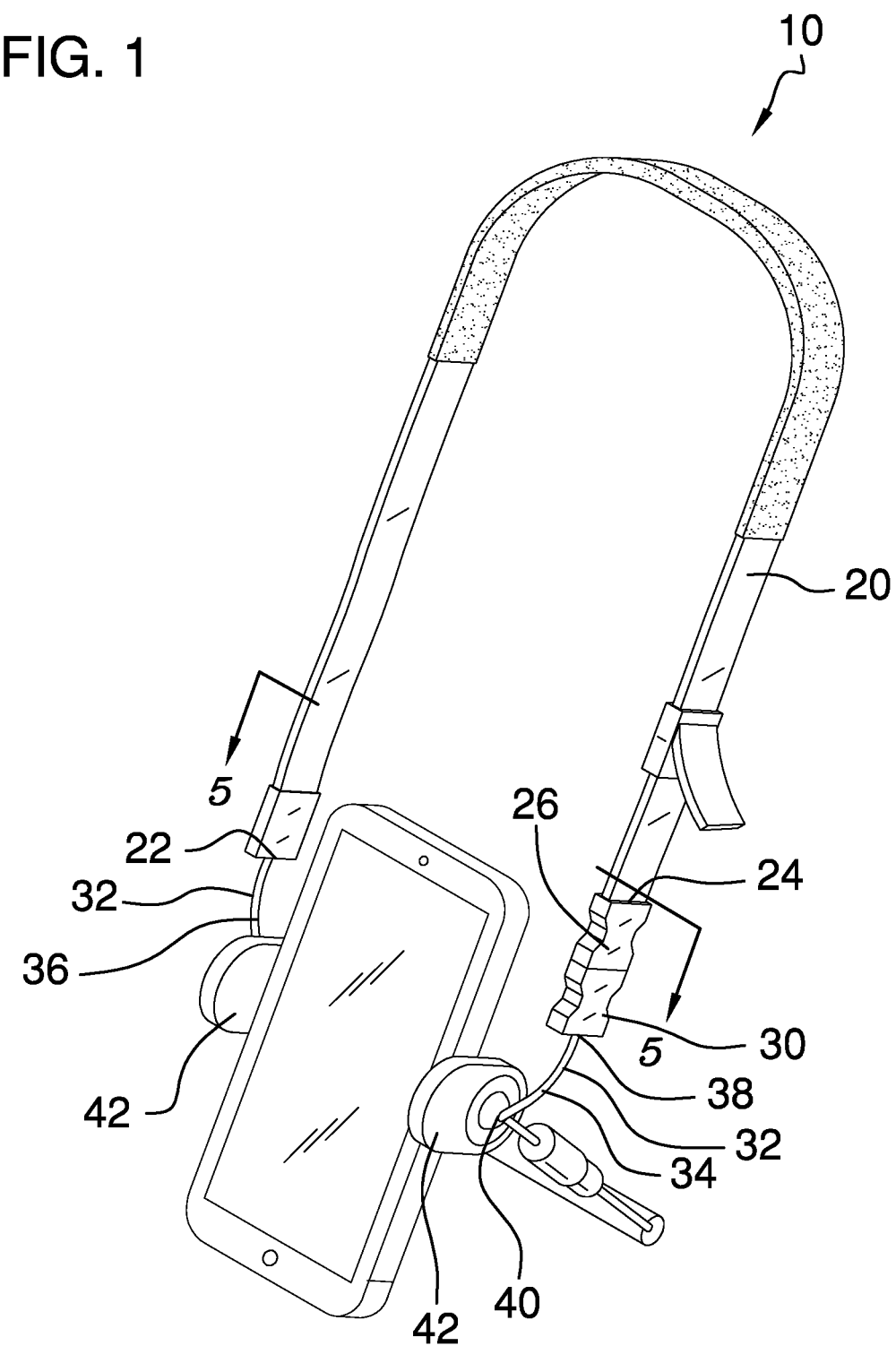
FIG. 1 is a front isometric view.
Figure 2:
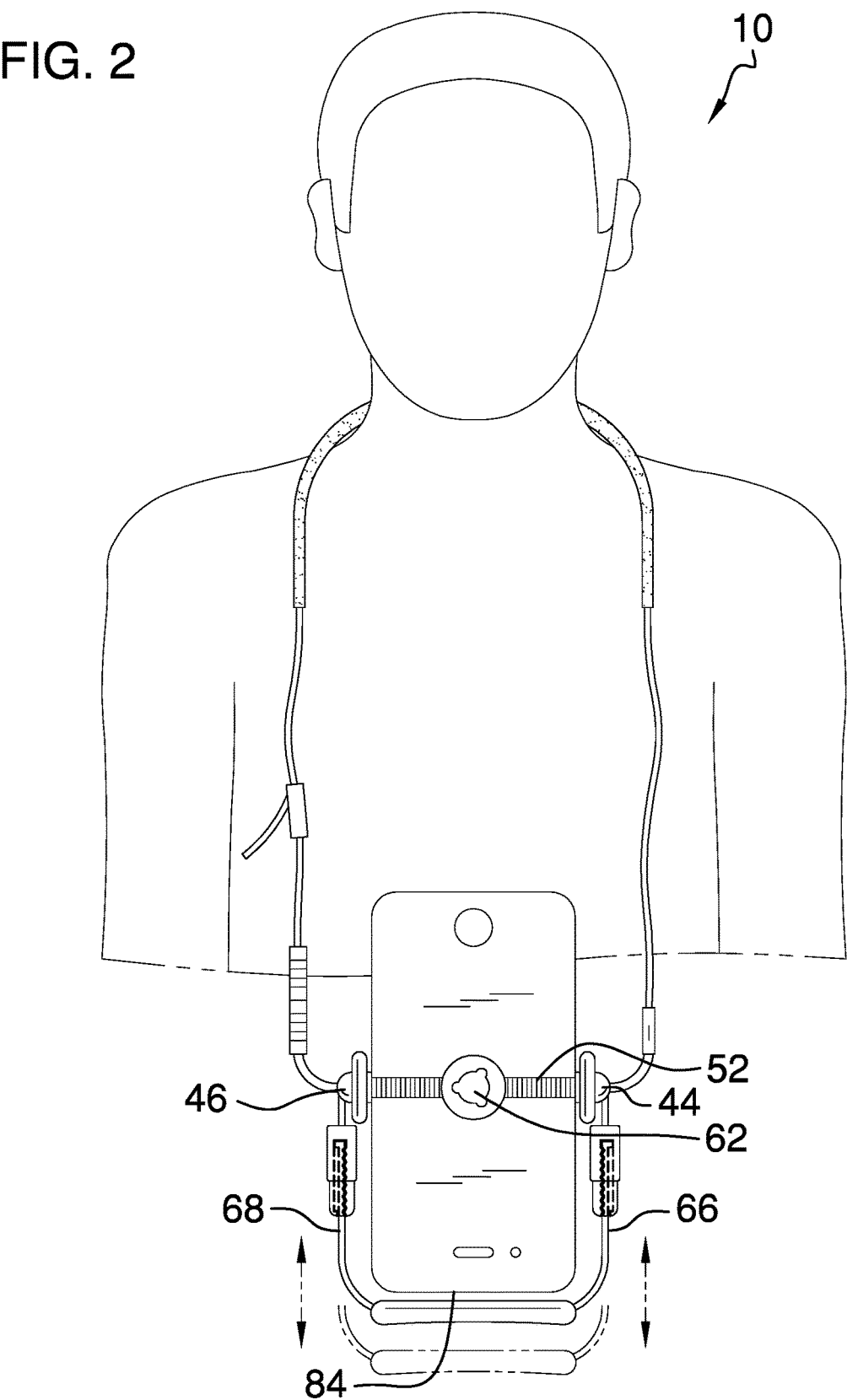
FIG. 2 is a rear elevation view.
Figure 3:
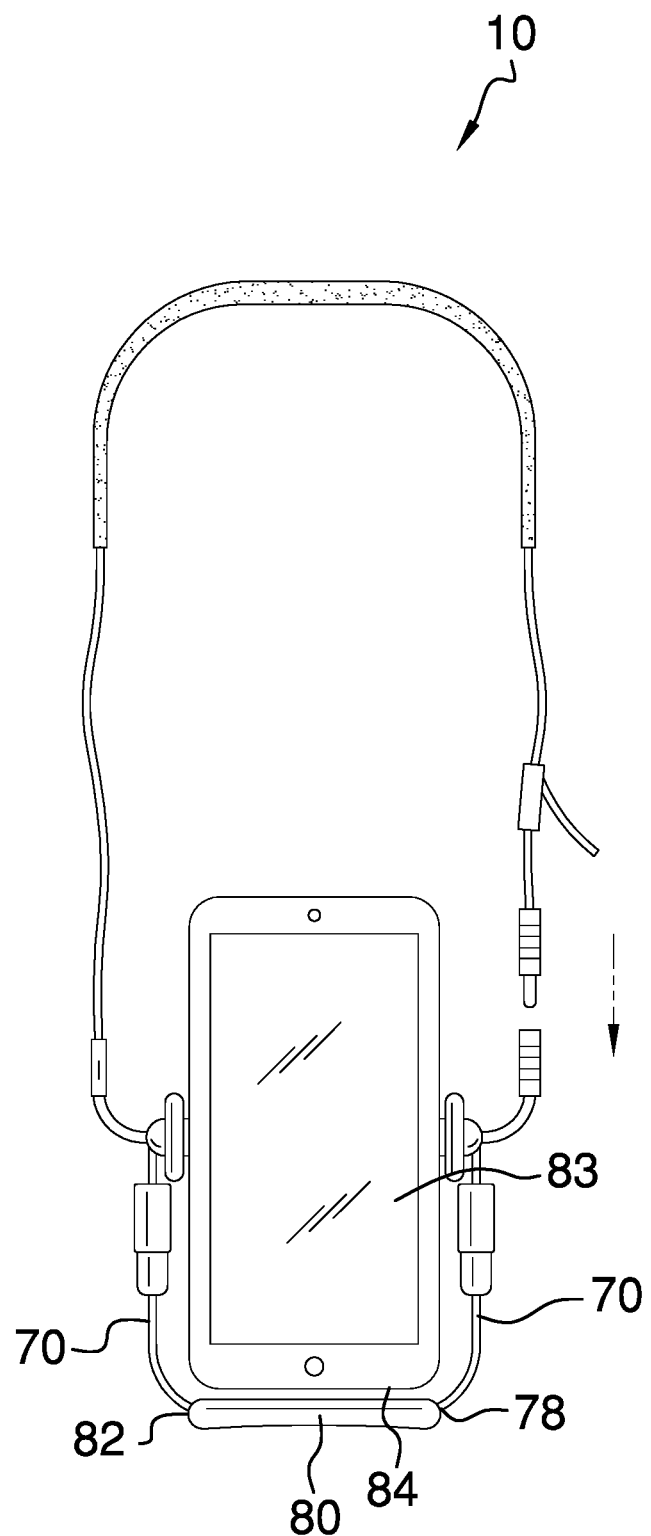
FIG. 3 is a front elevation view.
Figure 4:
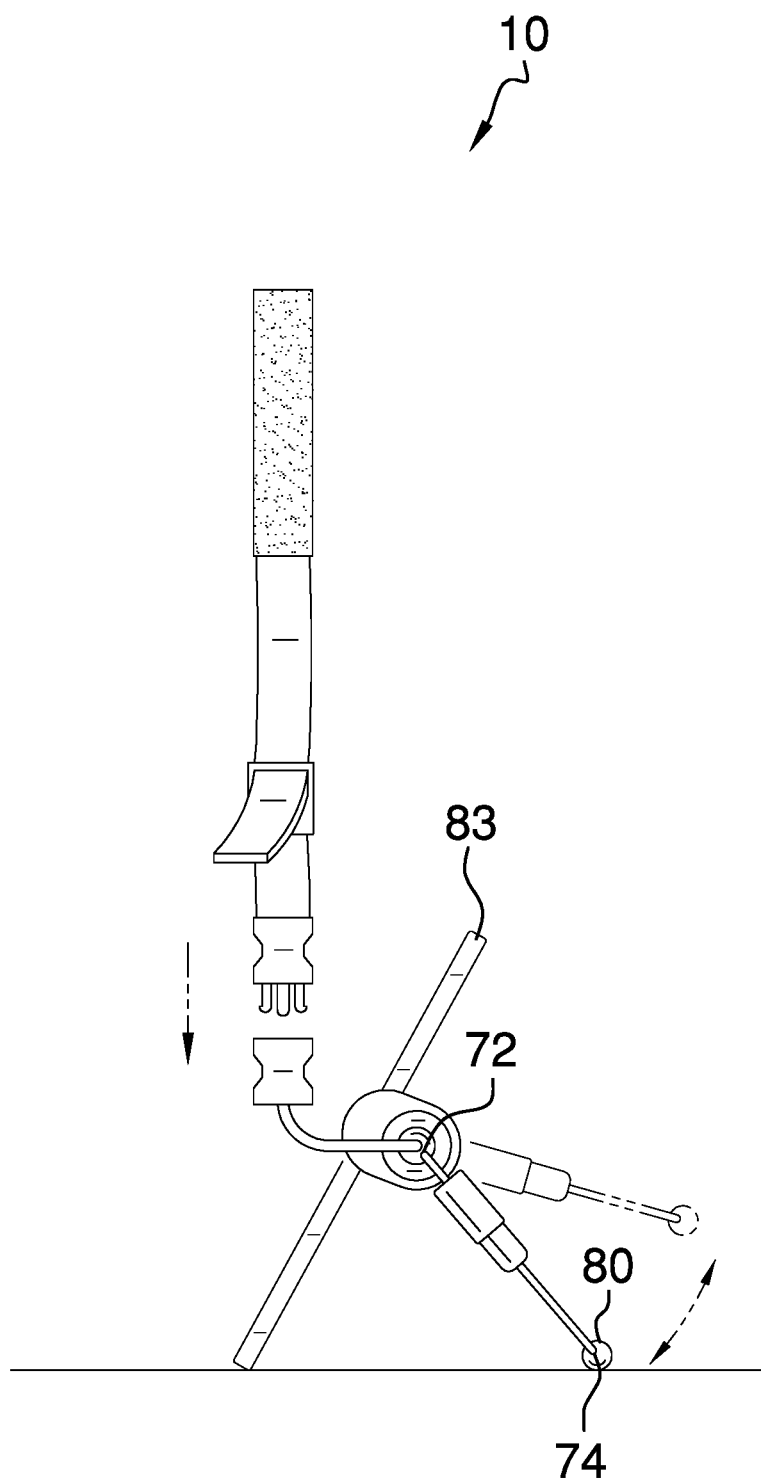
FIG. 4 is a side elevation view.
Figure 5:
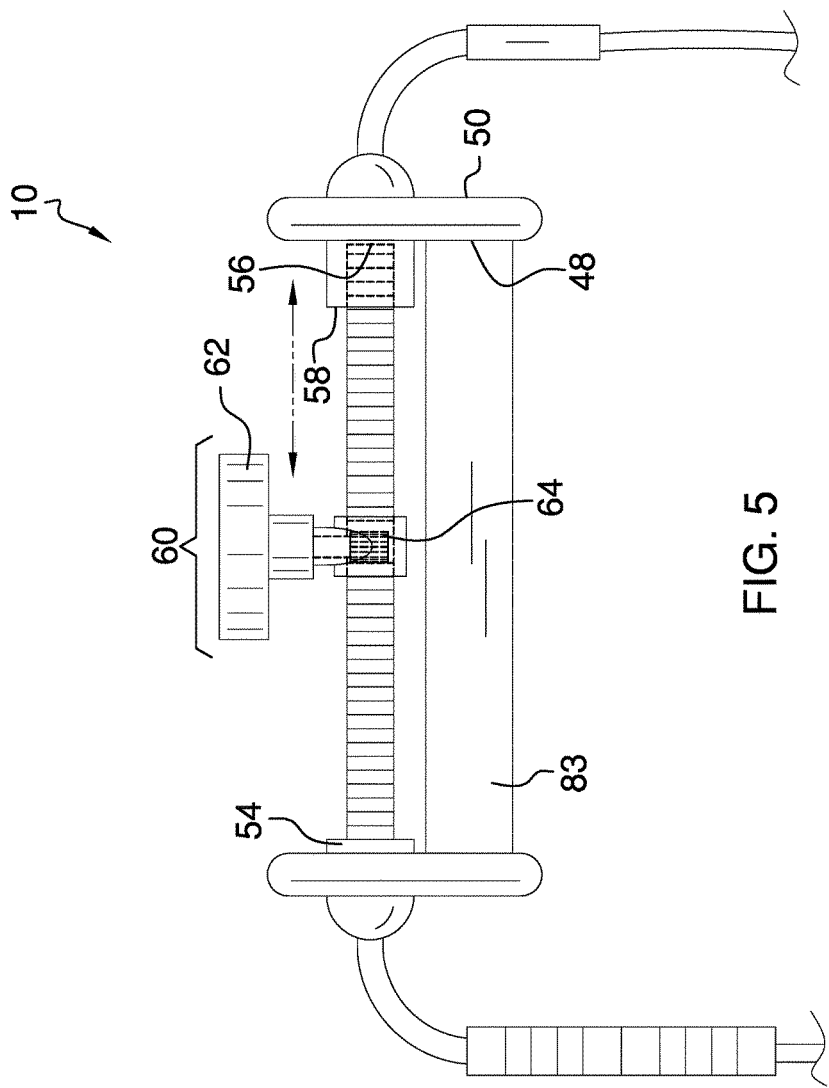
FIG. 5 is a top plan view.

With reference now to the drawings, and in particular FIGS. 1 through 5 thereof, an example of the instant support and carrying apparatus for a cellular phone employing the principles and concepts of the present support and carrying apparatus for a cellular phone and generally designated by the reference number 10 will be described.

Referring to FIGS. 1 through 5 the present support and carrying apparatus for a cellular phone 10 is illustrated. The support and carrying apparatus for a cellular phone 10 includes an adjustable inverted U-shaped padded strap 20 having a left end 22 and a right end 24. A length of the strap 20 is configured to fit over a neck of a wearer. A male member 26 of a snap buckle fastener 28 is attached to the right end 24 of the strap 20, with the male member 26 being removably engageable with a female member 30. A pair of second straps 32 includes a right second strap 34 and a left second strap 36. Each of the right second strap 34 and the left second strap 36 has a top end 38 and a bottom end 40. The top end 38 of each of the right second strap 34 and the left second strap 36 is medially attached to the female member 30 of the snap buckle fastener 28 and the left end 22 of the strap 20, respectively. A pair of mounting bases 42 includes a right mounting base 44 and a left mounting base 46. Each of the pair of mounting bases 42 is substantially obround. Each of the right mounting base 44 and the left mounting base 46 has an interior surface 48 and an exterior surface 50. The bottom end 40 of each of the right second strap 34 and the left second strap 36 is attached to the exterior surface 50 of each of the right mounting base 44 and the left mounting base 46, respectively.

The support and carrying apparatus for a cellular phone 10 further includes a lead screw 52 having a first end 54 and a second end 56. The first end 54 is mounted to the interior surface 48 of the right mounting base 44, and the second end 56 is adjustably and threadably engageable within a cap 58 attached to the interior surface 48 of the left mounting base 46. The lead screw 52 is coupled to a bevel gear system 60 and a length adjustment mechanism 62. The length adjustment mechanism 62 is configured to rotate the lead screw 52 to increase and, alternately, decrease the distance between the right mounting base 44 and the left mounting base 46 along a length of the lead screw 52 in response to a rotation of a bevel gear 64 of the bevel gear system 60. Each of a right arm support 66 and a left arm support 68 of a pair of telescopic arm supports 70 has a top edge 72 and a bottom edge 74. The top edge 72 of each of the right arm support 66 and the left arm support 68 is pivotably attached to the exterior surface 50 of each of the right mounting base 44 and the left mounting base 46, respectively. The bottom edge 74 of each of the right arm support 66 and the left arm support 68 is attached to a right surface 78 of a middle arm support 80 and a left surface 82 of the middle arm support 80, respectively. The right arm support 66 is disposed substantially parallel to the left arm support 68, and the middle arm support 80 is disposed substantially parallel to the lead screw 52.

A cellular phone 83 is removably mountable between the interior surface 48 of each of the right mounting base 44 and the left mounting base 46 in front of the lead screw 52. The middle arm support 80 is configured to be removably disposed underneath a bottom surface 84 of the cellular phone 82. A circumference of the middle arm support 80 is optionally greater than a circumference of each of the pair of arm supports 70.

What is claimed is:

1. A support and carrying apparatus for a cellular phone comprising:
    an adjustable inverted U-shaped padded strap having a left end and a right end, wherein a length of the strap is configured to fit over a neck of a wearer;
    a snap buckle fastener having a male member and a female member, wherein the male member is attached to the strap right end, wherein the male member is removably engageable with the female member;
    a pair of second straps comprising a right second strap and a left second strap, each of the right second strap and the left second strap having a top end and a bottom end, wherein the top end of each of the right second strap and the left second strap is medially attached to the female member of the snap buckle fastener and the strap left end, respectively;
    a pair of mounting bases comprising a right mounting base and a left mounting base, each of the right mounting base and the left mounting base having an interior surface and an exterior surface, wherein the bottom end of each of the right second strap and the left second strap is attached to the exterior surface of each of the right mounting base and the left mounting base, respectively;
    a lead screw having a first end and a second end, wherein the first end is mounted to the interior surface of the right mounting base, and the second end is adjustably and threadably engageable within a cap attached to the interior surface of the left mounting base, wherein the lead screw is coupled to a bevel gear system and a length adjustment mechanism, wherein the length adjustment mechanism is configured to rotate the lead screw to increase and, alternately, decrease the distance between the right mounting base and the left mounting base along a length of the lead screw in response to a rotation of a bevel gear of the bevel gear system; and
    a pair of telescopic arm supports comprising a right arm support and a left arm support, each of the right arm support and the left arm support having a top edge and a bottom edge, wherein the top edge of each of the right arm support and the left arm support is pivotably attached to the exterior surface of each of the right mounting base and the left mounting base, respectively, and the bottom edge of each of the right arm support and the left arm support is attached to a right surface of a middle arm support and a left surface of the middle arm support, respectively;
    wherein the right arm support is disposed substantially parallel to the left arm support;
    wherein the middle arm support is disposed substantially parallel to the lead screw;

wherein a cellular phone is removably mountable between the interior surface of each of the right mounting base and the left mounting base in front of the lead screw;

wherein the middle arm support is configured to be removably disposed underneath a bottom surface of the cellular phone.

2. The support and carrying apparatus for a cellular phone of claim 1 wherein each of the pair of mounting bases is substantially obround.

3. The support and carrying apparatus for a cellular phone of claim 2 wherein a circumference of the middle arm support is greater than a circumference of each of the pair of arm supports.

\* \* \* \* \*